United States Patent
Alvanos

(10) Patent No.: US 10,125,620 B2
(45) Date of Patent: Nov. 13, 2018

(54) GAS TURBINE ENGINE CMC AIRFOIL ASSEMBLY

(71) Applicant: United Technologies Corporation, Farmington, CT (US)

(72) Inventor: Ioannis Alvanos, West Springfield, MA (US)

(73) Assignee: United Technologies Corporation, Farmington, CT (US)

( * ) Notice: Subject to any disclaimer, the term of this patent is extended or adjusted under 35 U.S.C. 154(b) by 309 days.

(21) Appl. No.: 14/906,618

(22) PCT Filed: Jun. 19, 2014

(86) PCT No.: PCT/US2014/043105
§ 371 (c)(1),
(2) Date: Jan. 21, 2016

(87) PCT Pub. No.: WO2015/047485
PCT Pub. Date: Apr. 2, 2015

(65) Prior Publication Data
US 2016/0186583 A1   Jun. 30, 2016

Related U.S. Application Data

(60) Provisional application No. 61/859,438, filed on Jul. 29, 2013.

(51) Int. Cl.
F01D 5/30 (2006.01)
F01D 5/28 (2006.01)
(Continued)

(52) U.S. Cl.
CPC ............ F01D 5/3084 (2013.01); C04B 35/71 (2013.01); C04B 37/006 (2013.01);
(Continued)

(58) Field of Classification Search
CPC . F01D 5/28; F01D 5/282; F01D 5/284; F01D 5/3084; F01D 9/041; F01D 5/2007;
(Continued)

(56) References Cited

U.S. PATENT DOCUMENTS

| | | |
|---|---|---|
| 6,451,416 B1 | 9/2002 | Holowczak et al. |
| 6,648,597 B1 | 11/2003 | Widrig et al. |
| 8,231,354 B2 | 7/2012 | Campbell et al. |
| 2006/0110254 A1 | 5/2006 | Itzel et al. |

(Continued)

FOREIGN PATENT DOCUMENTS

| | | |
|---|---|---|
| EP | 2189626 B1 | 5/2010 |
| WO | 2014150370 | 9/2014 |

OTHER PUBLICATIONS

"Overview of Transient Liquid Phase and Partial Transient Liquid Phase Bonding", J. Mater. Sci. (2011) 46: 5305-5323.*
(Continued)

*Primary Examiner* — Logan Kraft
*Assistant Examiner* — Elton Wong
(74) *Attorney, Agent, or Firm* — Carlson, Gaskey & Olds, P.C.

(57) ABSTRACT

A gas turbine engine airfoil assembly includes an airfoil and an attachment structure respectively bonded to opposing sides of a platform. At least one of the airfoil, the platform and the attachment structure are constructed from a ceramic matrix composite.

18 Claims, 5 Drawing Sheets

(51) Int. Cl.
  *C04B 35/71*   (2006.01)
  *F01D 9/04*    (2006.01)
  *B23P 15/04*   (2006.01)
  *C04B 37/00*   (2006.01)
  *C04B 37/02*   (2006.01)

(52) U.S. Cl.
  CPC ............ *C04B 37/026* (2013.01); *F01D 5/282* (2013.01); *F01D 5/284* (2013.01); *F01D 5/3007* (2013.01); *F01D 9/041* (2013.01); *B23P 15/04* (2013.01); *C04B 2237/086* (2013.01); *C04B 2237/121* (2013.01); *C04B 2237/122* (2013.01); *C04B 2237/123* (2013.01); *C04B 2237/124* (2013.01); *C04B 2237/125* (2013.01); *C04B 2237/127* (2013.01); *C04B 2237/128* (2013.01); *C04B 2237/16* (2013.01); *C04B 2237/365* (2013.01); *C04B 2237/368* (2013.01); *C04B 2237/38* (2013.01); *C04B 2237/405* (2013.01); *C04B 2237/62* (2013.01); *C04B 2237/72* (2013.01); *C04B 2237/76* (2013.01); *C04B 2237/80* (2013.01); *F05D 2300/6033* (2013.01); *Y02T 50/672* (2013.01)

(58) Field of Classification Search
  CPC .. B23P 15/04; C04B 35/71; F05D 2300/6033; Y02T 50/672
  See application file for complete search history.

(56) References Cited

U.S. PATENT DOCUMENTS

| | | | |
|---|---|---|---|
| 2009/0165924 A1* | 7/2009 | Steibel | F01D 5/147 156/89.11 |
| 2011/0027098 A1* | 2/2011 | Noe | C04B 35/573 416/241 B |
| 2011/0194941 A1* | 8/2011 | Parkin | B29C 70/48 416/224 |
| 2012/0020805 A1* | 1/2012 | Suciu | F01D 5/147 416/241 R |
| 2012/0301303 A1 | 11/2012 | Alvanos et al. | |
| 2012/0301306 A1 | 11/2012 | Alvanos et al. | |
| 2012/0301314 A1 | 11/2012 | Alvanos et al. | |
| 2012/0301317 A1 | 11/2012 | Alvanos et al. | |
| 2013/0004325 A1 | 1/2013 | McCaffrey et al. | |
| 2013/0004326 A1 | 1/2013 | McCaffrey | |
| 2013/0011271 A1 | 1/2013 | Shi et al. | |
| 2013/0084189 A1* | 4/2013 | Diego | C04B 37/001 416/241 B |
| 2014/0030076 A1* | 1/2014 | Nunez | F01D 5/282 415/183 |
| 2015/0218966 A1 | 8/2015 | Kling et al. | |
| 2016/0003072 A1 | 1/2016 | Chang et al. | |

OTHER PUBLICATIONS

International Search Report for PCT/US2014/043105 dated Apr. 17, 2015.
International Preliminary Report on Patentability for PCT Application No. PCT/US2014/043105, dated Feb. 11, 2016.

* cited by examiner

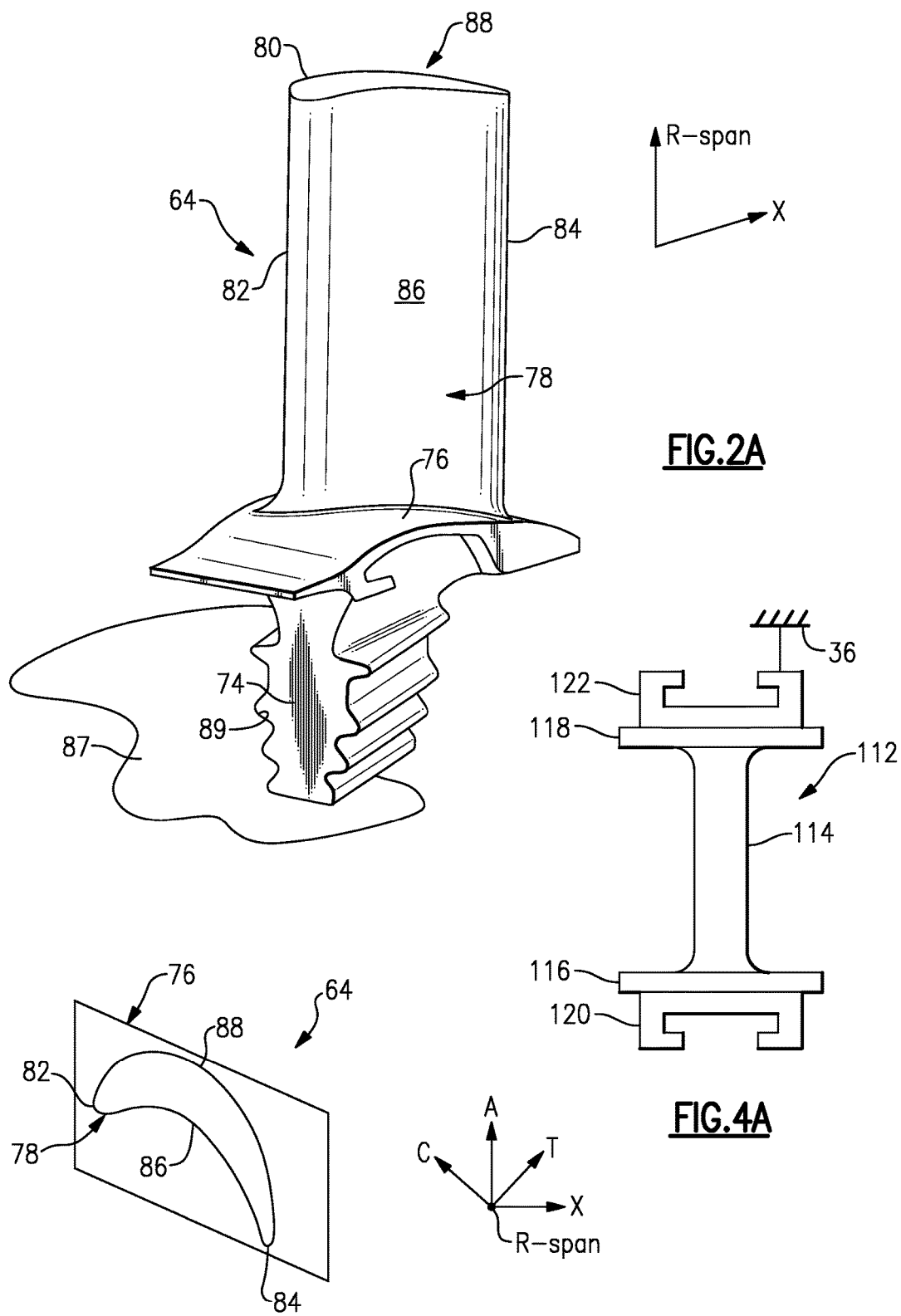

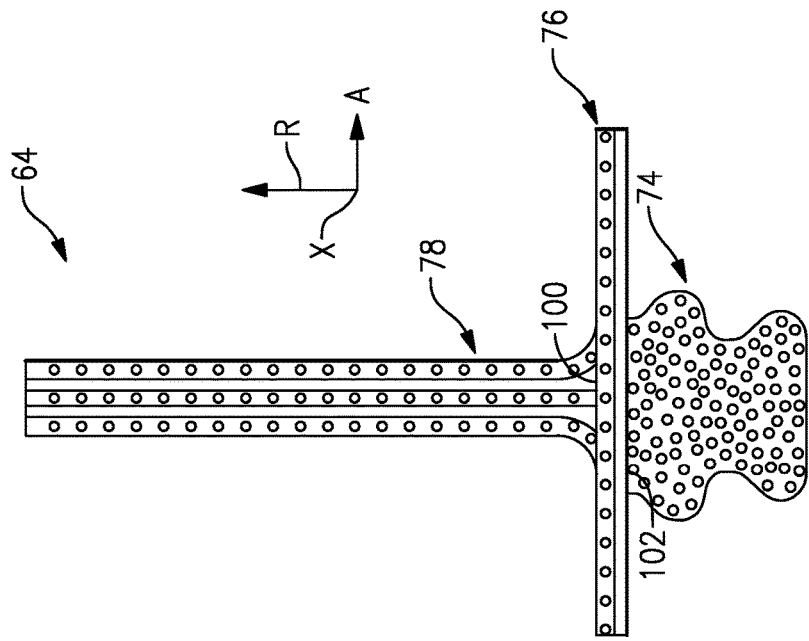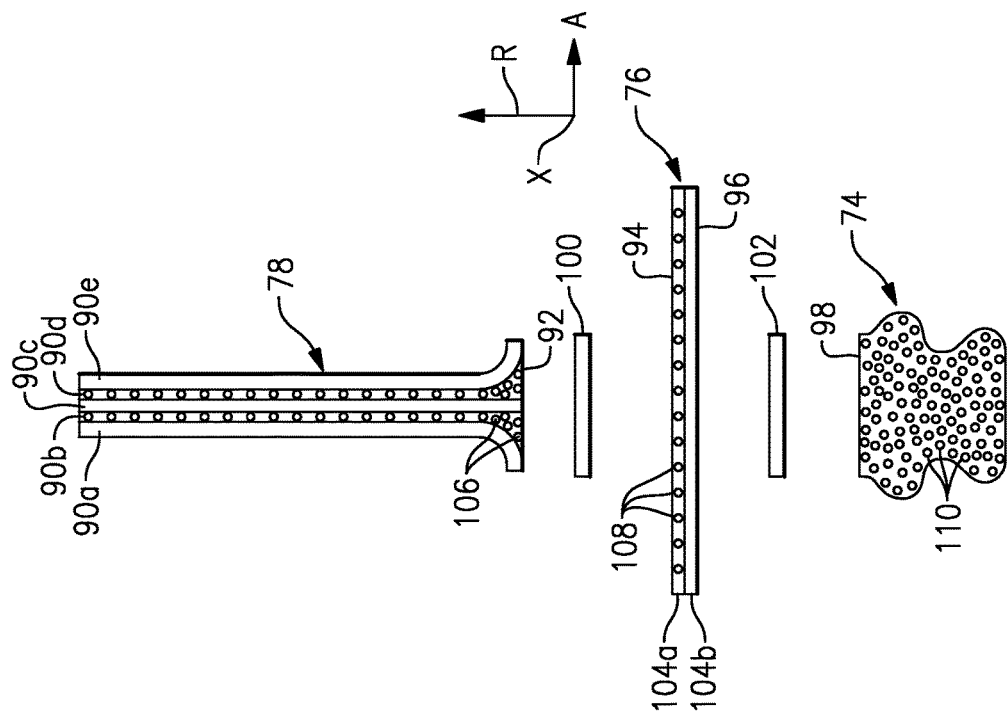

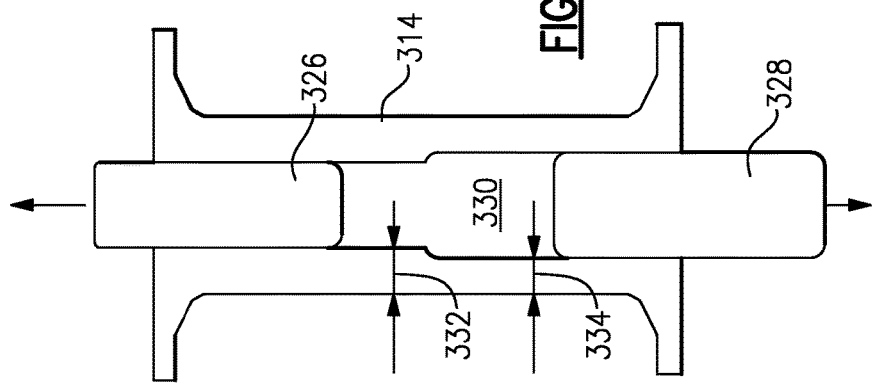
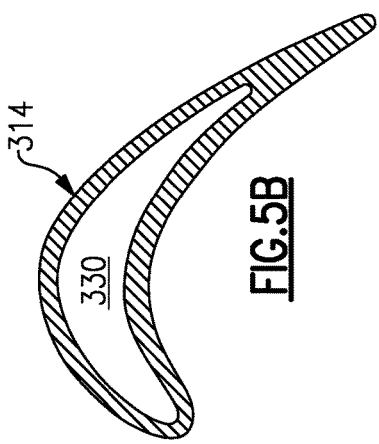
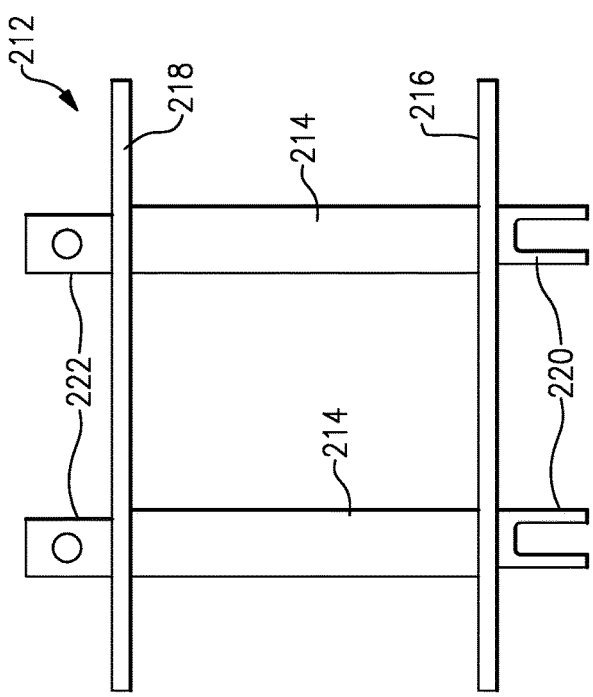

GAS TURBINE ENGINE CMC AIRFOIL ASSEMBLY

CROSS-REFERENCE TO RELATED APPLICATIONS

This application claims priority to U.S. Provisional Application No. 61/859,438, which was filed on Jul. 29, 2013.

BACKGROUND

This disclosure relates to a gas turbine engine airfoil assembly. More particularly, the disclosure relates to blades or vanes that include at least one CMC portion secured to other portions. The other portions may be produced from material other than CMC.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Ceramic matrix composite (CMC) materials have been increasingly proposed for high temperature applications such as blades and vanes in the hot section of the engine as the industry pursues higher maximum temperature engine designs. Many of the proposed blade and vane designs are not practical in that CMC material is stiff and cannot be easily formed to allow for the creation of more complex geometry of blades and vanes. In particular, CMC materials do not form well along sharp angles and radii. Thus, producing CMC blades and vanes is difficult as a practical matter.

SUMMARY

In one exemplary embodiment, a gas turbine engine airfoil assembly includes an airfoil and an attachment structure respectively bonded to opposing sides of a platform. At least one of the airfoil, the platform and the attachment structure are constructed from a ceramic matrix composite.

In a further embodiment of the above, at least one of the airfoil and the attachment structure is bonded to the platform using at least one of a transient liquid phase bonding material and a partial transient liquid phase bonding material.

In a further embodiment of the above, at least one of the airfoil, the attachment structure and the platform is a hybrid component including ceramic matrix composite and a metallic member.

In a further embodiment of the above, the airfoil is constructed from the ceramic matrix composite.

In a further embodiment of the above, the platform is constructed from the ceramic matrix composite.

In a further embodiment of the above, the attachment structure is constructed from the ceramic matrix composite.

In a further embodiment of the above, at least one of the airfoil, the attachment structure and the platform is constructed from a metal alloy.

In a further embodiment of the above, the airfoil assembly is a blade. The attachment structure is a root.

In a further embodiment of the above, the airfoil assembly is a vane. The attachment structure is a tab or a hook.

In a further embodiment of the above, at least two of the airfoil, the platform and the attachment structure are constructed from a ceramic matrix composite.

In a further embodiment of the above, each of the airfoil, platform and the attachment structure are constructed from a ceramic matrix composite.

In a further embodiment of the above, the at least one ceramic matrix composite-constructed airfoil, platform and attachment structure includes fibers having an orientation. The fibers generally are parallel to an adjacent surface to which at least one ceramic matrix composite-constructed airfoil, platform and attachment structure is bonded.

In a further embodiment of the above, at least one ceramic matrix composite-constructed airfoil, platform and attachment structure includes multiply layers. Each layer has fibers. The fibers are between layers that are oriented transversely to one another.

In a further embodiment of the above, the airfoil provides an internal cavity.

In a further embodiment of the above, the airfoil has a variable wall thickness.

In a further embodiment of the above, multiple airfoils are secured to common platforms to provide a vane cluster.

In another exemplary embodiment, a method of manufacturing an airfoil assembly includes bonding a platform to an airfoil and an attachment structure. At least one of the airfoil, the platform and the attachment structure are constructed from a ceramic matrix composite.

In a further embodiment of the above, the bonding step includes melting at least one of a transient liquid phase bonding material and a partial transient liquid phase bonding material.

In a further embodiment of the above, the ceramic matrix composite is wrapped about a die to provide the airfoil with an internal cavity.

In a further embodiment of the above, the airfoil includes a variable wall thickness.

BRIEF DESCRIPTION OF THE DRAWINGS

The disclosure can be further understood by reference to the following detailed description when considered in connection with the accompanying drawings wherein:

FIG. 2A is a perspective view of the airfoil having the disclosed cooling passage.

FIG. 2B is a plan view of the airfoil illustrating directional references.

FIG. 3A is an exploded view of an example blade having a CMC portion.

FIG. 3B is a schematic view of the components shown in FIG. 3A bonded to one another.

FIG. 4A is a schematic view of a stator vane having a CMC portion.

FIG. 4B is a schematic view of a stator vane doublet.

FIG. 5A is a schematic view of a hollow stator vane airfoil taken in section in a radial direction.

FIG. 5B is a cross-sectional view of the airfoil shown in FIG. 5A taken in a chord-wise direction.

DETAILED DESCRIPTION

Figure 1:
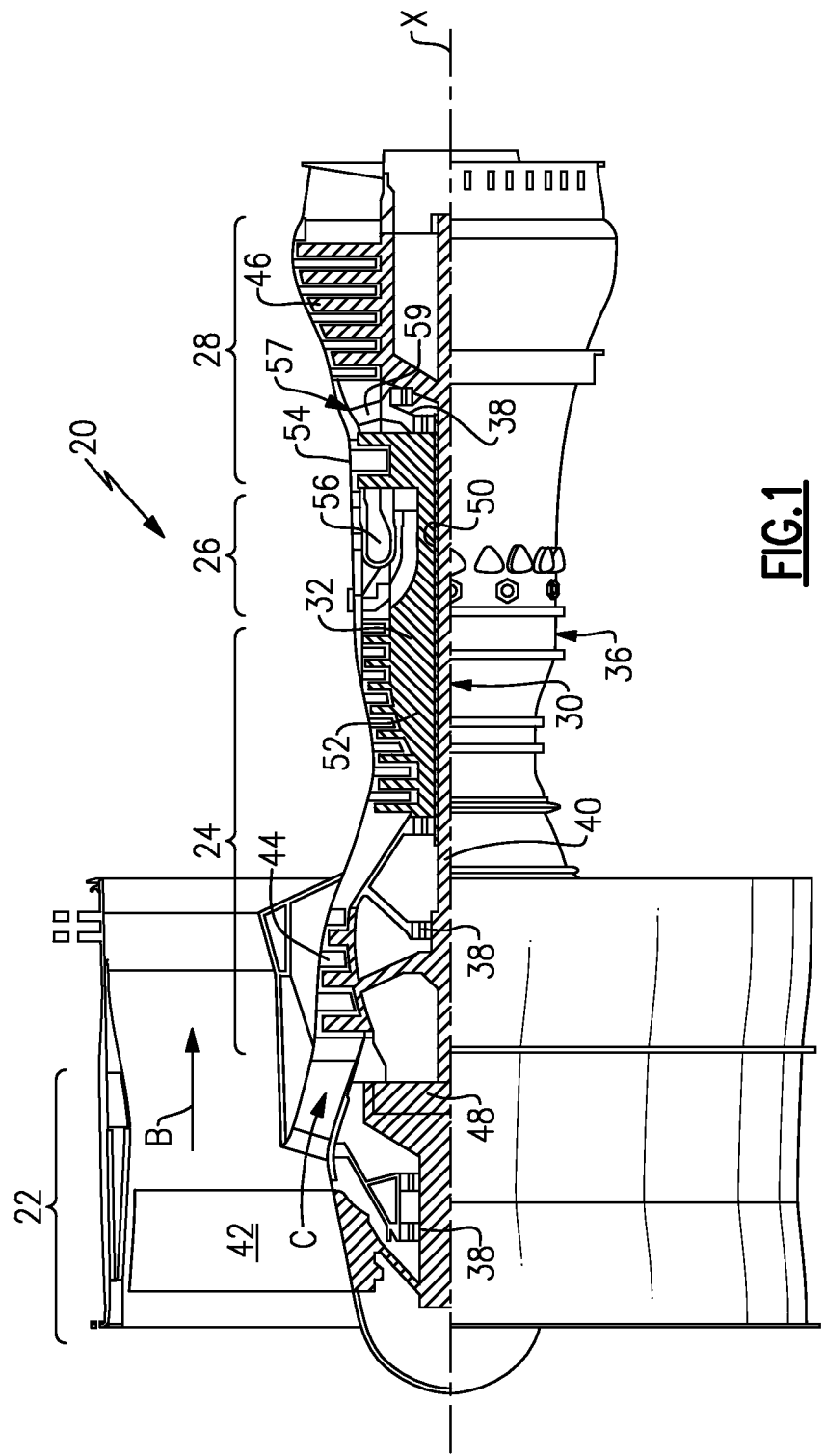
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ("TSFC")"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram } ° R)/(518.7° R)]^{0.5}$. The "Low corrected fan tip speed", as disclosed herein according to one non-limiting embodiment, is less than about 1150 ft/second.

Referring to FIGS. 2A and 2B, a root 74 of each turbine blade 64 is received in a correspondingly shaped slot 89 of a rotor 87. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates exterior airfoil surface extending in a chord-wise direction C from a leading edge 82 to a trailing edge 84. The airfoil 78 is provided between pressure (typically concave) and suction (typically convex) wall 86, 88 in an airfoil thickness direction T, which is generally perpendicular to the chord-wise direction C. Multiple turbine blades 64 are arranged circumferentially in a circumferential direction A. The airfoil 78 extends from the platform 76 in the radial direction R, or spanwise, to the tip 80.

Referring to FIGS. 3A and 3B, an airfoil assembly, such as the blade 64 is provided using a separate airfoil 78, platform 76 and attachment structure, such as the root 74. In one example, at least one of these components is constructed from a ceramic matrix composite (CMC), and in other examples, at least two of these components, or all of these components, may be constructed from CMC. The airfoil assembly may be provided as a hybrid in which at least one of the components is a metal alloy, such as a high temperature nickel alloy. For example, the root 74 may be a metal alloy, which may better withstand the loads within the slot 89. Moreover, each component may be constructed as a Hybrid structure. For example, a CMC airfoil may include a metallic member, such as a leading edge and/or trailing edge metallic sheath.

By providing the airfoil assembly as separate components, the complex features of each portion of the airfoil, platform and root may be more easily incorporated. Each component may include multiple layers, each layer has fibers that are oriented in a desired direction to provide the desired strength properties to the component as well as orient the fibers in a direction that enhances the bond between the component and the adjacent structure. The fibers within a layer may also be provided as a mesh.

In one example, the airfoil 78 is provided by layers 90A-90E. In the example, the layers 90A, 90C, 90E may be oriented in a radial direction R, for example. Fibers 106 in the layers 90B, 90D may be oriented along the axial-circumferential (X-A) plane, which enhances the bond between the airfoil 78 and the platform 76. Similarly, the platform 76 may be constructed from multiple layers 104A, 104B with fibers 108. The root 74 may include fibers 110 oriented in the axial direction X. Since each portion is formed separately, the fibers can positioned to more easily accommodate the complex features of the component while orienting the fibers in a direction that enhances the bond between the components. Other fiber orientations may be used depending upon the shape of the portion being formed, the load direction and the fiber orientation of adjacent structures to which the portion is being bonded.

The platform 76 includes first and second platform surfaces 94, 96. An airfoil surface 92 of the airfoil 78 is bonded to the first platform surface 76 with a first bonding material 100. A second bonding material 102 secures the attachment structure surface 98 to the second platform surface 96. The first and second bonding materials 100, 102 are provided by a transient liquid phase bonding material and/or a partial transient liquid phase bonding material.

The bonding material results in a solid bond by the process of transient liquid phase (TLP) or partial transient liquid phase (PTLP) bonding. Transient liquid phase (TLP) and partial transient liquid phase (PTLP) bonding are described in detail in "Overview of Transient Liquid Phase and Partial Transient Liquid Phase Bonding", J. Mater. Sci. (2011) 46: 5305-5323 (referred to as "the article") is incorporated herein by reference in its entirety. In PTLP bonding, bonding material may be a multilayer structure comprising thin layers of low melting point metals or alloys placed on each side of a much thicker layer of a refractory metal or alloy core. Upon heating to a bonding temperature, a liquid is formed via either direct melting of a lower-melting layer or a eutectic reaction of a lower-melting layer with the refractory metal layer. The liquid that is formed wets each ceramic substrate, while also diffusing into adjacent structure. During the process, the liquid regions solidify isothermally and homogenization of the entire bond region leads to a solid refractory bond.

Example bond alloy layers (separated by pipe characters) for bonding silicon carbide to silicon carbide fiber reinforced silicon carbide (SiC/SiC) or to silicon carbide fiber reinforced silicon nitrogen carbide (SiC/SiNC) are C|Si|C, Cu—Au—Ti|Ni|Cu—Au—Ti, and Ni—Si|Mo|Ni—Si multilayer metal structures.

Example bond alloy layers for bonding silicon nitride to silicon carbide fiber reinforced silicon carbide (SiC/SiC) or silicon carbide fiber reinforced silicon nitrogen carbide (SiC/SiNC) are Al|Ti|Al, Au|Ni—Cr|Au, Cu—Au|Ni|Cu—Au, Co|Nb|Co, Co|Ta|Co, Co|Ti|Co, Co|V|Co, Cu—Ti|Pd|Cu—Ti, and Ni|V|Ni multilayer metal structures.

Additional example bond alloy layers include non-symmetric multilayer metal structures, such as Cu—Au—Ti|Ni|Cu—Au, Au|Ni—Cr|Cu—Au, Au|Ni—Cr|Cu—Au—Ti, and Al|Ti|Co. These non-symmetric structures can accommodate for differences in wetting characteristics between the ceramic material and the CMC material.

It should be understood that other bonding materials can be used according to the article and based upon the materials of the components to be bonded.

The disclosed airfoil assembly may be used for vanes in addition to blades. Several example configurations are illustrated in FIGS. 4A-5D. It should be understood that other airfoil assembly configurations may be used other than those shown. Referring to FIG. 4A, separate components may also be used to form a stator vane 112. The stator vane 112 includes an airfoil 114 bonded to inner and outer platforms 116, 118. Attachment structures corresponding to inner and outer tabs or hooks 120, 122, for example, are respectively bonded to the inner and outer platforms 116, 118. FIG. 4B illustrates a stator vane doublet 212, although other multiples of airfoils may be used. The airfoils 214 are bonded to platforms 216, 218. Attachment structures 220, 222 are respectively secured to the platforms 216, 218 by the bonding material.

Figure 5D:
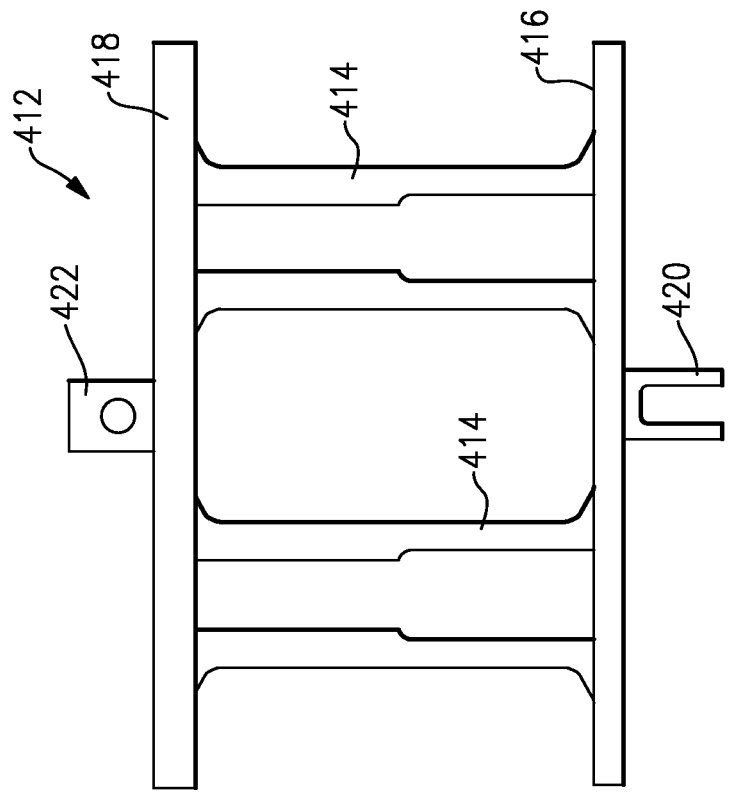
FIG. 5D is a schematic view of a stator vane doublet having hollowed airfoils.
Figure 5C:
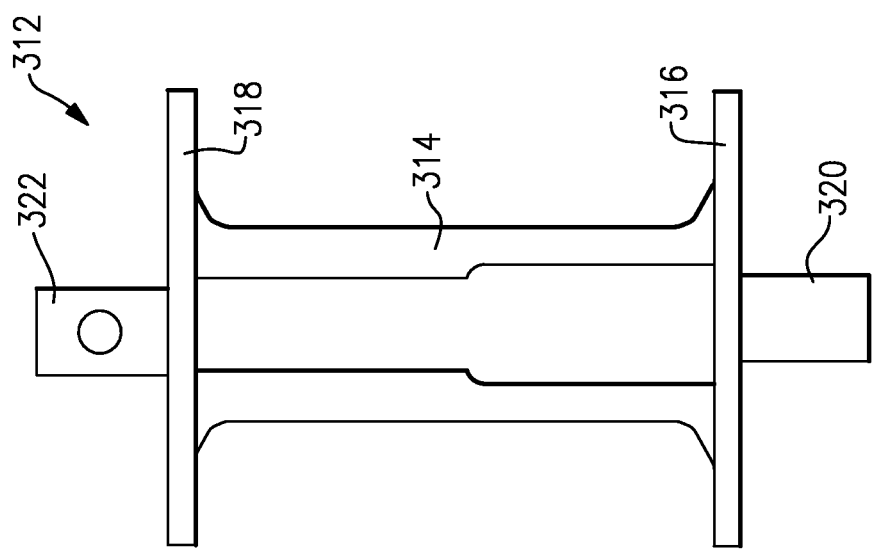
FIG. 5C is a schematic view of a stator vane with the airfoil shown in FIG. 5A.

The embodiments illustrated in FIGS. 5A-5D illustrate a CMC airfoil having a hollow internal cavity, which reduces the amount of CMC layers needed to form the airfoil. Referring to FIGS. 5A and 5B, one or more dies 326, 328 are provided and include a desired profile for an internal cavity 330. One or more layers of CMC material are wrapped about the dies to form the airfoil 314. Different sized dies may be used to produce variable airfoil wall thicknesses having different first and second thicknesses 332, 334 that are different than one another, which provides desired thickness where needed along the radial length of the airfoil 314. The airfoil 314 is bonded to the platforms 316, 318, as shown in FIG. 5C. Attachment structures 320, 322 are bonded to the platforms 316, 318 respectively to provide vane 312. The hollow airfoil 414 may be provided as a vane cluster 412, as shown in FIG. 5D. The airfoils 414 are secured to common platforms 416, 418, which support attachment structures 420, 422 respectively.

Although example embodiments have been disclosed, a worker of ordinary skill in this art would recognize that certain modifications would come within the scope of the claims. For that and other reasons, the following claims should be studied to determine their true scope and content.

What is claimed is:

1. A gas turbine engine airfoil assembly comprising:
an airfoil and an attachment structure respectively bonded to opposing sides of a platform, at least one of the airfoil, the platform and the attachment structure are constructed from a ceramic matrix composite, and wherein at least one of the airfoil, the attachment structure and the platform is constructed from a metal alloy.

2. The gas turbine engine airfoil assembly according to claim 1, wherein at least one of the airfoil and the attachment structure is bonded to the platform using at least one of a transient liquid phase bonding material and a partial transient liquid phase bonding material.

3. The gas turbine engine airfoil assembly according to claim 1, wherein at least one of the airfoil, the attachment structure and the platform is a hybrid component including ceramic matrix composite and a metallic member.

4. The gas turbine engine airfoil assembly according to claim 1, wherein the airfoil is constructed from the ceramic matrix composite.

5. The gas turbine engine airfoil assembly according to claim 1, wherein the platform is constructed from the ceramic matrix composite.

6. The gas turbine engine airfoil assembly according to claim 1, wherein the attachment structure is constructed from the ceramic matrix composite.

7. The gas turbine engine airfoil assembly according to claim 1, wherein the airfoil assembly is a blade, and the attachment structure is a root.

8. The gas turbine engine airfoil assembly according to claim 1, wherein the airfoil assembly is a vane, and the attachment structure is a tab or a hook.

9. The gas turbine engine airfoil assembly according to claim 1, wherein at least two of the airfoil, the platform and the attachment structure are constructed from a ceramic matrix composite.

10. The gas turbine engine airfoil assembly according to claim 1, wherein the at least one ceramic matrix composite-constructed airfoil, platform and attachment structure includes fibers having an orientation, the fibers generally parallel to an adjacent surface to which the at least one ceramic matrix composite-constructed airfoil, platform and attachment structure is bonded.

11. The gas turbine engine airfoil assembly according to claim 10, wherein the at least one ceramic matrix composite-constructed airfoil, platform and attachment structure includes multiply layers, each layer having fibers, the fibers between layers oriented transversely to one another.

12. The gas turbine engine airfoil assembly according to claim 1, wherein the airfoil provides an internal cavity.

13. The gas turbine engine airfoil assembly according to claim 12, wherein the airfoil has a variable wall thickness.

14. The gas turbine engine airfoil assembly according to claim 1, wherein multiple airfoils are secured to common platforms to provide a vane cluster.

15. A method of manufacturing an airfoil assembly comprising:
bonding a platform to an airfoil and an attachment structure, wherein at least one of the airfoil, the platform and the attachment structure are constructed from a ceramic matrix composite, and wherein at least one of the airfoil, the attachment structure and the platform is constructed from a metal alloy.

16. The method according to claim 15, wherein the bonding step includes melting at least one of a transient liquid phase bonding material and a partial transient liquid phase bonding material.

17. The method according to claim 15, wherein the airfoil is constructed from a ceramic matrix composite, the method further comprising the step of wrapping the ceramic matrix composite about a die to provide the airfoil with an internal cavity.

18. The method according to claim 17, wherein the airfoil includes a variable wall thickness.

* * * * *